Aug. 18, 1942.  A. E. DIETZ  2,293,597
MAGNIFYING DEVICE
Filed Sept. 6, 1940  2 Sheets-Sheet 1
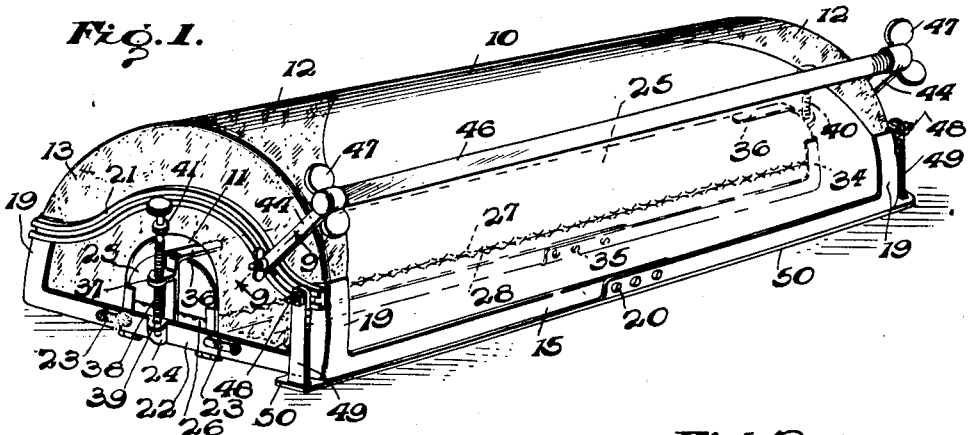
Fig. 1.
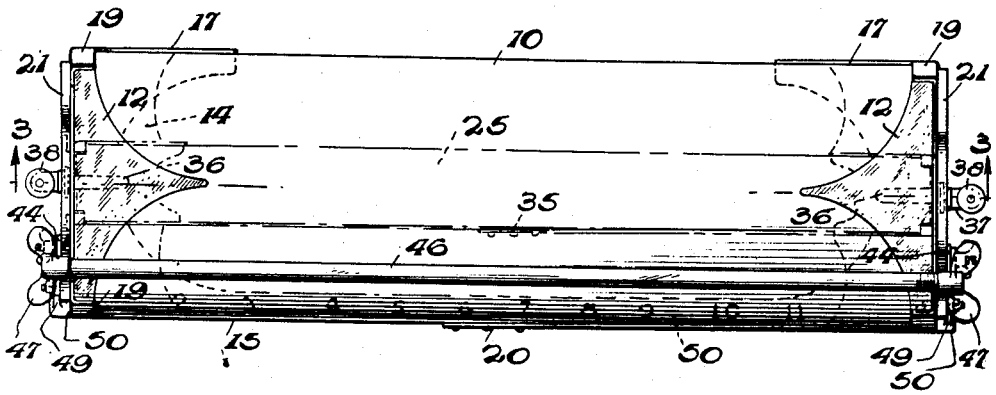
Fig. 2.
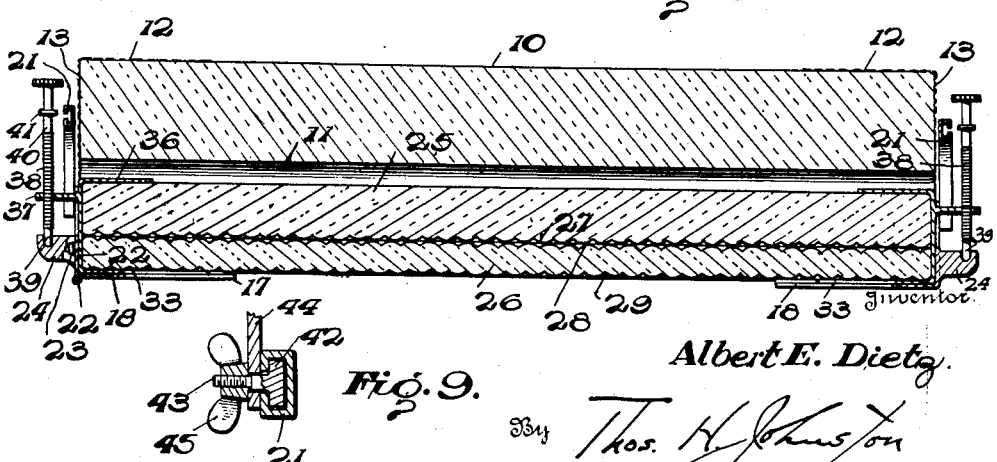
Fig. 3.
Fig. 9.
Inventor
Albert E. Dietz.
By Thos. H. Johnston
Attorney Aug. 18, 1942.    A. E. DIETZ    2,293,597
MAGNIFYING DEVICE
Filed Sept. 6, 1940    2 Sheets-Sheet 2
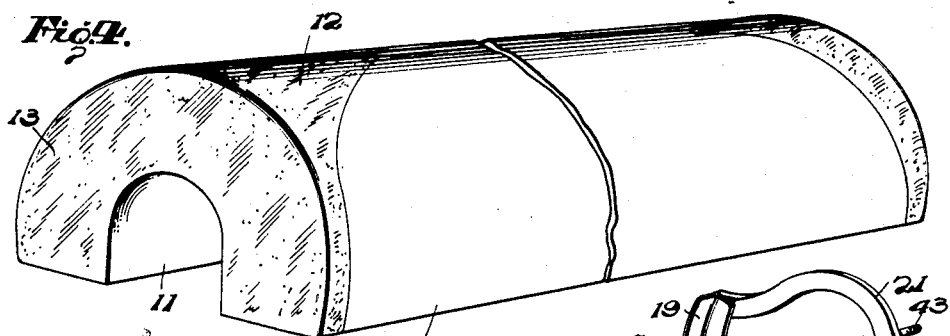
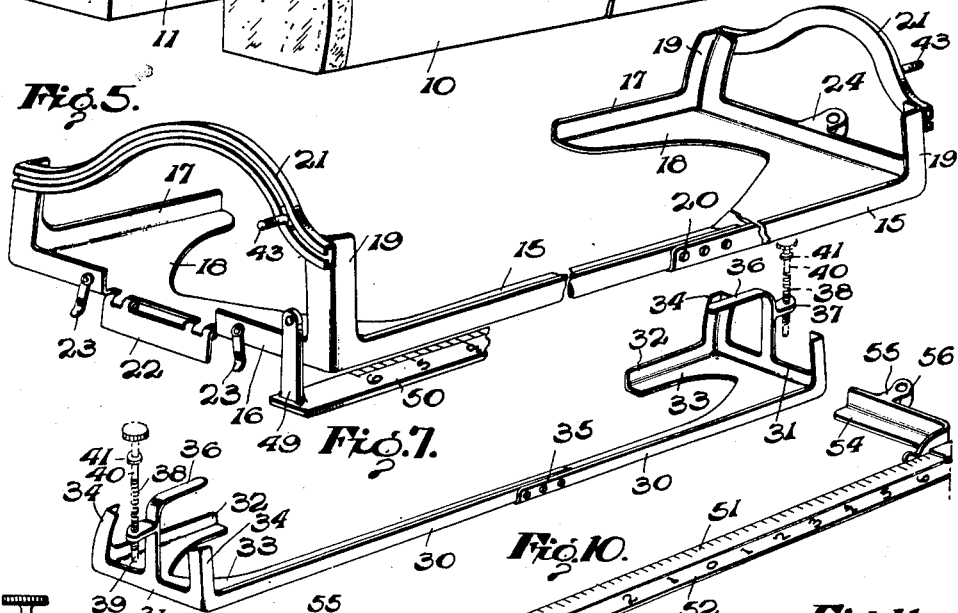
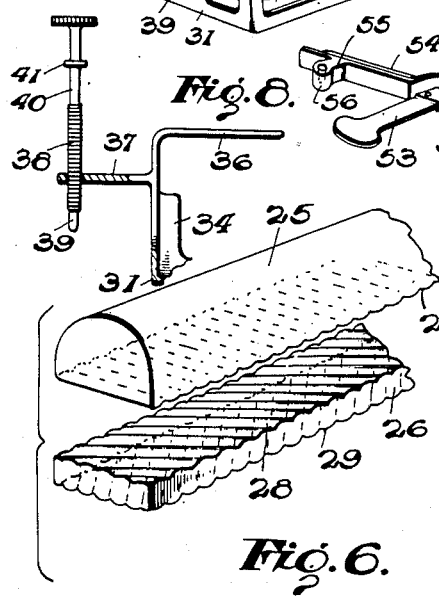
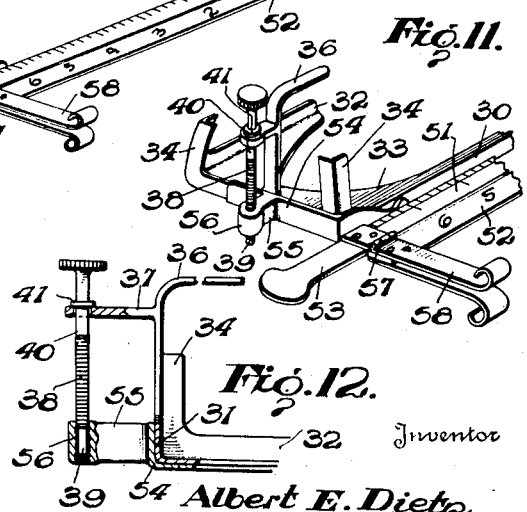
Inventor
Albert E. Dietz.
By Thos. H. Johnston
Attorney Patented Aug. 18, 1942

2,293,597

UNITED STATES PATENT OFFICE 2,293,597

MAGNIFYING DEVICE

Albert E. Dietz, Washington, D. C.

Application September 6, 1940, Serial No. 355,697

6 Claims. (Cl. 88—39)

This invention relates to an improved magnifying device especially designed for use as a convenient aid in reading although, however, the invention is well suited to many other adaptations and I do not, therefore, wish to be limited in this respect.

Among other objects, the invention seeks to provide a device which will embody an efficient paper weight, which function will enhance the desirability of keeping the device continuously present as a desk-convenience, for instance, and wherein, when so desired, the device may be moved into position over an average length line of printed matter, or typewritten matter, or script, for magnifying the whole line, so that the entire line may be read without the necessity of shifting the device along the line.

A further object of the invention is to provide a device wherein the subject matter viewed through the device will be magnified both vertically and horizontally, and wherein illuminating means will be provided for adjustment to a desired relative position or angle of vision to best enhance the visibility of said subject matter.

Another object of the invention is to provide a device having mirror surfaces located to reflect the light onto the subject matter magnified, to thus assist in the easy reading thereof.

Still another object is to provide a device embodying a magnifying core which may be installed or removed as a unit so that, for instance, a core of high magnification may be used interchangeably with a core of low magnification, wherein the core may be adjusted to focus the reading matter, wherein the core may be used separately from the body of the device, and wherein the core will be composed of complemental parts which may be readily fashioned or varied in design to attain the degree of magnification sought.

Another object of the invention is to provide a device embodying a rule adjustable to a desired best position or angle of vision for adapting the device for use in conjunction with maps or the like where distances or scales must be considered.

And the invention seeks, as a still further object, to provide a device well suited for use as a fixture adapted to magnify road signs, house numbers, or names on doors in the hallways of buildings or the like.

With the foregoing general objects, functions and results in view, as well as certain others which will be apparent from the following description, the invention consists in certain novel features, construction, mounting and combination of elements, as will be more fully and particularly pointed out and specified hereinafter.

In the accompanying drawings:

Figure 1 is a perspective view of my improved device.

Figure 2 is a top plan view.

Figure 3 is a vertical section on the line 3—3 of Figure 2.

Figure 4 is a perspective view of the body of the device.

Figure 5 is a perspective view particularly showing the base frame for the body.

Figure 6 is a fragmentary perspective view of the complemental transparencies of the magnifying core.

Figure 7 is a perspective view of the frame for the transparencies of Figure 6.

Figure 8 is an enlarged detail, particularly showing one of the focusing screws for adjusting the magnifying core.

Figure 9 is a detail section showing the slide blocks employed.

Figure 10 is a detail perspective view of an attachment used as a modification of the invention.

Figure 11 is a fragmentary perspective showing the device of Figure 9 attached to the frame of Figure 7, as in the modified construction.

Figure 12 is an enlarged detail, particularly showing one of the focusing screws of the prior embodiment of the invention as used in the modified construction.

As will appear during the course of the following description, this invention is suited to many adaptations and to endeavor to allude to all of the most self-suggestive would merely tend to detract from a clear description of a single embodiment. Therefore, in the interests of clarity, the device will be described primarily as a magnifying device for desk use, but in following this course I do not wish to be limited thereby, but desire protection for all uses and adaptations of the invention as may fall within the spirit and scope of the appended claims.

Referring more particularly to Figures 1 to 9 of the drawings, I employ a substantially semi-cylindrical body 10 which may be of glass, plastics or other approved material and formed in the body, at the axis thereof, is a more or less semi-cylindrical channel 11 which, in the instance illustrated, is approximately concentric to the perimeter of the body. At its ends, the body is preferably dipped in a suitable silvering solution to provide mirror surfaces 12, 13 and 14 at the top, ends and bottom of the body near the extremities thereof. The purpose of these surfaces is to reflect light toward the channel 11.

Mounting the body 10 is a frame of angle strips or the like. This frame is composed of identical sections each of which comprises a front bar 15, end bar 16 and rear short bar 17, the several bars being braced at the angles therebetween by bottom webs 18. The frame sections are, of course, formed to fit the body 10 at the base thereof and rising from the sections at the angles of the several bars thereof are angle shaped ears 19 curved to fit or hug the contour of the body at its ends. The front bars 15 of the sections of the frame overlap, and detachably connecting the sections are screws or the like 20 engaged through the bars.

Suitably fixed to and extending between the ears 19 of each frame section are upwardly bowed, channel shaped tracks 21 and formed from the vertical flange of the end bar 16 of the left hand section of the frame, as viewed in Figure 5 of the drawings, is a suitably hinged gate 22 normally held closed by spring clips 23. Mounted on the outer side of the gate, as seen in Figure 1, and on the end bar of the right hand section of the frame are cups 24, the purpose of which will presently appear.

Fitting more or less loosely within the channel 11 of the body 10 is a removable magnifying core, best seen in Figure 3 of the drawings. More particularly, this core includes a top semi-cylindrical transparency 25, and a mating, flat, bottom transparency 26, both of which may be of glass, plastics or other approved material. As will be appreciated, the exterior curved surface of the transparency 25 will provide vertical magnification of reading matter viewed therethrough and formed on the flat bottom of said transparency are transverse, semi-cylindrical beads 27 disposed edge to edge in close parallel relation for providing horizontal magnification of said reading matter. Further, the transparency 26 is provided at its upper side with diagonal beads 28 and at its lower side with diagonal beads 29 extending at substantially a right angle to the beads 28, the beads 28 and 29 being like the beads 27 and coöperating therewith and with the transparency 25 to provide magnification of reading matter viewed through the magnifying core.

Fitting the transparencies 25 and 26 is a base frame of angle strips or the like, said frame being best seen in Figure 7 of the drawings. This frame is formed of identical sections each of which includes a front bar 30, end bar 31 and rear short bar 32, the several bars being braced at the angles therebetween by bottom webs 33. Rising from the several bars of each section at the angles between said bars are angle shaped ears 34 formed to hug the countour of the transparencies 25 and 26 at their ends, and detachably connecting the sections of the frame are screws or the like 35 engaged through the front bars 30 at their overlapping ends. The frame will thus retain the transparencies 25 and 26 in assembled relation to provide an individual core unit, and rising from the end bars 31 of the frame sections are tongues 36 engaging over the ends of the transparency 25 for limiting said transparency against endwise displacement.

Projecting laterally from the tongues 36 are lugs 37 and adjustable through said lugs are focusing screws 38 each having a smooth tip 39, a smooth neck 40 and a collar 41. As best seen in Figure 1, the smooth tips 39 of the screws are disposed to engage in the cups 24 so that by turning the screws, the magnifying core may be raised or lowered in the channel 11 of the body 10 and thus focused relative to reading matter lying beneath the core. To remove the core, the focusing screw at the right, as viewed in Figure 1, is removed when the gate 22 is opened. The magnifying unit may then, as will be perceived, be shifted or withdrawn endwise from said channel and a like new core of different magnifying qualities substituted therefor, if so desired.

Mounted in the tracks 21, as seen in Figure 9, are slide blocks 42 from which project studs 43, and mounted on the studs are arms 44 removably secured by wing nuts 45. Extending between the upper ends of the arms 44 is a tubular illuminating element 46 of glass or other approved material, and disposed within the tube or coating the inner surface thereof is an approved phosphorescent material or other light emanating substance. However, if so desired, an electrically heated filament may be substituted or an electrically activated gas, such as Neon gas and, if found expedient, the front semi-circle of the tube, from end to end, may be provided with a suitable mirror surface for reflecting the light rays downwardly through the magnifying core.

At its ends, the tube 46 is provided with knobs 47 one of which is removable so that the tube may be readily assembled upon the arms 44 and, as will now be seen, the tube may, by shifting the blocks 42 along the tracks 21, be positioned relative to the body 10 to obtain the best angle of illumination for reading matter being viewed through the body and the magnifying core.

The tracks 21 also carry other slide blocks identical with the blocks 42 and provided with studs 48, and removably secured on said studs are arms 49 at the ends of a rule 50. Thus, this rule may be adjusted forwardly or rearwardly into proper vision for determining distances, as on a map.

Figures 10, 11 and 12 of the drawings show a modification wherein the magnifying unit previously described is used separately from the body 10. As seen in Figure 10, a graduated plate 51 is employed and mating therewith is a digit plate 52 numbered from zero at the middle of the plate upwardly toward both ends.

The plate 51 is provided at its ends with handles 53 and formed on said plate, at its rear edge, are rearwardly extending, angle shaped shoes 54 at the outer sides of which are lugs 55 terminating in internally threaded sleeves 56. As will be observed, the shoes 54 are spaced apart to fit the ends of the base frame of the magnifying unit, in which position the sleeves 56 are disposed to receive the screws 38. These screws are first threaded through the lugs 37 until the necks 40 of the screws are disposed at the lugs, when the collars 41 will swivel the screws upon the lugs. Accordingly, the screws may then be screwed through the sleeves 56 past the tips 39, when, as seen in Figures 11 and 12 of the drawings, further adjustment of the screws will serve to bind the shoes 54 beneath the ends of the base frame of the magnifying unit.

Connecting the plates 51 and 52 are hinges 57 and fixed to the ends of the latter plate are spring clamps 58. Thus, the clamps 58 may be readily attached, as will be well understood, to the finder of a copy holder as, for instance, the commercially well-known Line-O-Time, for supporting the magnifying unit to magnify each line as the finder is lowered each time while the hinges 51 will accommodate any difference in angle between the magnifying unit and the finder.

Having thus described my invention, what I claim is:

1. A magnifying device including an elongated semi-cylindrical transparent body flat at its lower side and convex at its upper side for magnifying subject matter viewed through the body, the body being provided at its lower side with an axial channel substantially concentric to the upper face of the body, and a semi-cylindrical magnifying core movable in said channel diametrically thereof toward and away from the crown of the channel and provided with a convex upper face to cooperate with the upper contour of the body for magnifying subject matter over which the body is positioned and visible through the body and said core.

2. A magnifying device including an elongated semi-cylindrical transparent body flat at its lower side and convex at its upper side for magnifying subject matter viewed through the body, the body being provided at its lower side with an axial channel substantially concentric to the upper face of the body, a semi-cylindrical magnifying core freely mounted in said channel and provided with a convex upper face to cooperate with the upper contour of the body for magnifying subject matter over which the body is positioned and visible through the body and said core, the core being shiftable diametrically of said channel toward and away from the crown of the channel to vary the spacing therebetween, and means for adjustably shifting said core.

3. A magnifying device including an elongated semi-cylindrical transparent body flat at its lower side and convex at its upper side for magnifying subject matter viewed through the body, the body being provided at its lower side with an axial channel substantially concentric to the upper face of the body, a base frame fitting the lower side of the body at its perimeter, a semi-cylindrical magnifying core freely mounted in said channel and flat at its lower side and convex at its upper side to cooperate with the upper contour of the body for magnifying subject matter over which the body is positioned and visible through the body and said core, a base frame fitting the lower side of said core at its perimeter, and adjusting screws carried by the base frame of the core to coact with the base frame of the body for shifting the core toward and away from the crown of said channel to vary the spacing therebetween.

4. A magnifying device including an elongated semi-cylindrical transparent body flat at its lower side and convex at its upper side for magnifying subject matter viewed through the body, the body being provided at its lower side with an axial channel substantially concentric to the upper face of the body, a base frame fitting the lower side of the body at its perimeter, a semi-cylindrical magnifying core freely mounted in said channel and provided with a convex upper face to cooperate with the upper contour of the body for magnifying subject matter over which the body is positioned and visible through the body and said core, and a gate carried by said base frame for limiting the core against displacement from said channel at one end thereof.

5. In a magnifying device for reading purposes, the combination of an elongated semi-cylindrical transparent body flat at its lower side and convex at its upper side for magnifying subject matter viewed through the body and provided with a complemental magnifying core to cooperate with the body for magnifying said subject matter when viewed through the body and said core, a base frame fitting the lower side of the body at its perimeter and provided with pairs of ears fitting the curved contour of the body at its ends, substantially arcuate tracks extending between said pairs of ears and conforming to the curvature of the convex upper side of the body, blocks slidable in said tracks, and an illuminating element carried by said blocks to extend from end to end of the body, the blocks being movable for shifting said element about the curved surface of the body to any desired critical position for illuminating subject matter over which the body is positioned and visible therethrough.

6. A magnifying device including an elongated semi-cylindrical transparent body flat at its lower side and convex at its upper side for magnifying subject matter viewed through the body, the body being provided at its lower side with an axial channel substantially concentric to the upper face of the body, a semi-cylindrical magnifying core freely mounted in said channel and provided with a convex upper face to cooperate with the upper contour of the body for magnifying subject matter over which the body is positioned and visible through the body and said core, said core including a top transparency having a flat lower face provided with transverse convex magnifying beads, and a bottom transparency provided at its upper face with diagonal convex magnifying beads and at its lower face with diagonal convex magnifying beads extending at substantially a right angle to the former beads, said beads cooperating with the convex surfaces of the body and core to provide both vertical and horizontal magnification of said subject matter.

ALBERT E. DIETZ.